April 14, 1953 P. H. WAYNE 2,634,561
METHOD OF HONING GROOVED ELEMENTS
Filed Oct. 30, 1948 3 Sheets-Sheet 1

INVENTOR.
Peter H. Wayne.
BY
Harness, Dickey & Pierce.
ATTORNEYS.

April 14, 1953     P. H. WAYNE     2,634,561
METHOD OF HONING GROOVED ELEMENTS
Filed Oct. 30, 1948     3 Sheets-Sheet 2
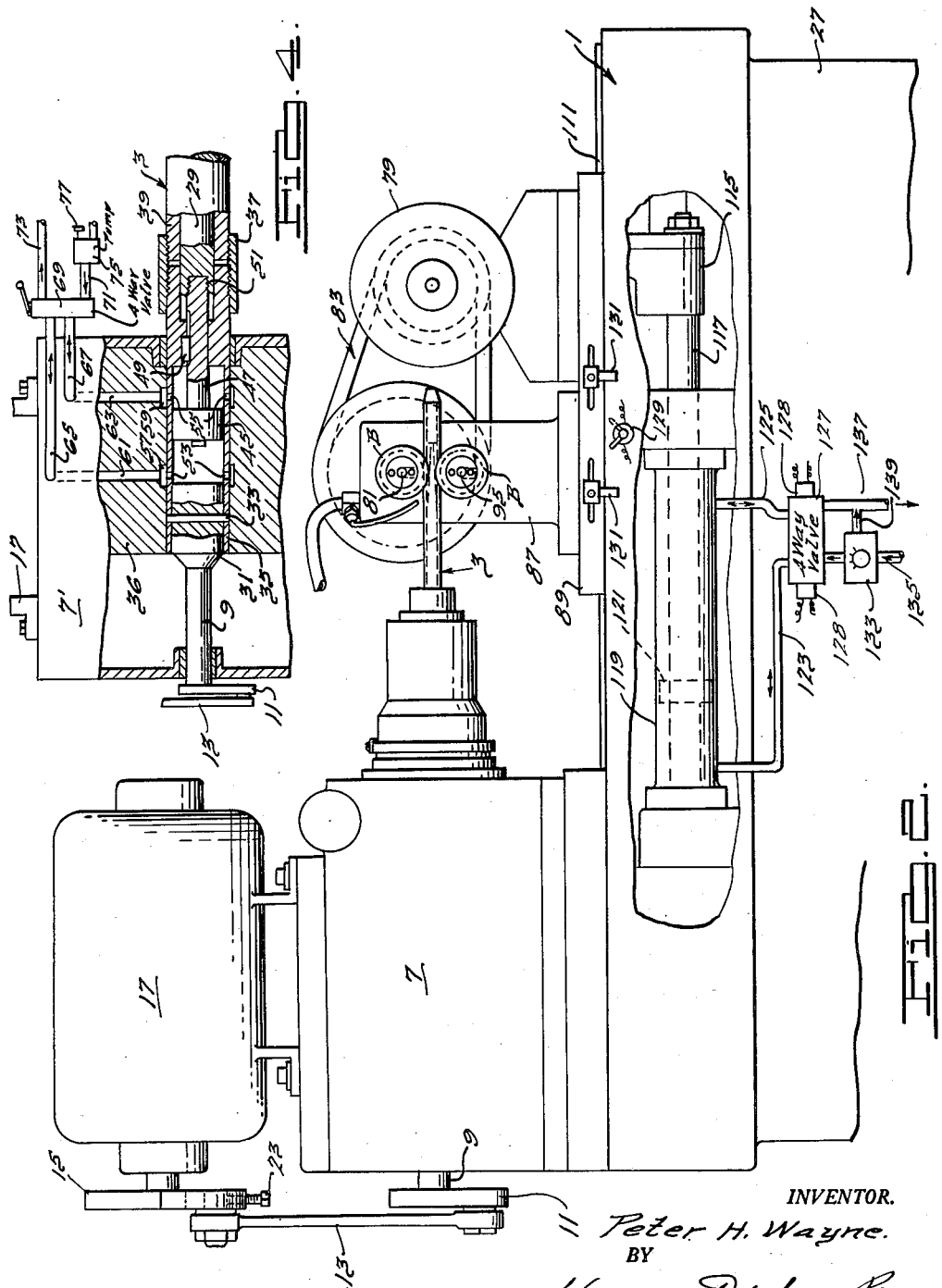
INVENTOR.
Peter H. Wayne.
BY
Harness, Dickey & Pierce.
ATTORNEYS.

April 14, 1953 P. H. WAYNE 2,634,561
METHOD OF HONING GROOVED ELEMENTS
Filed Oct. 30, 1948 3 Sheets-Sheet 3
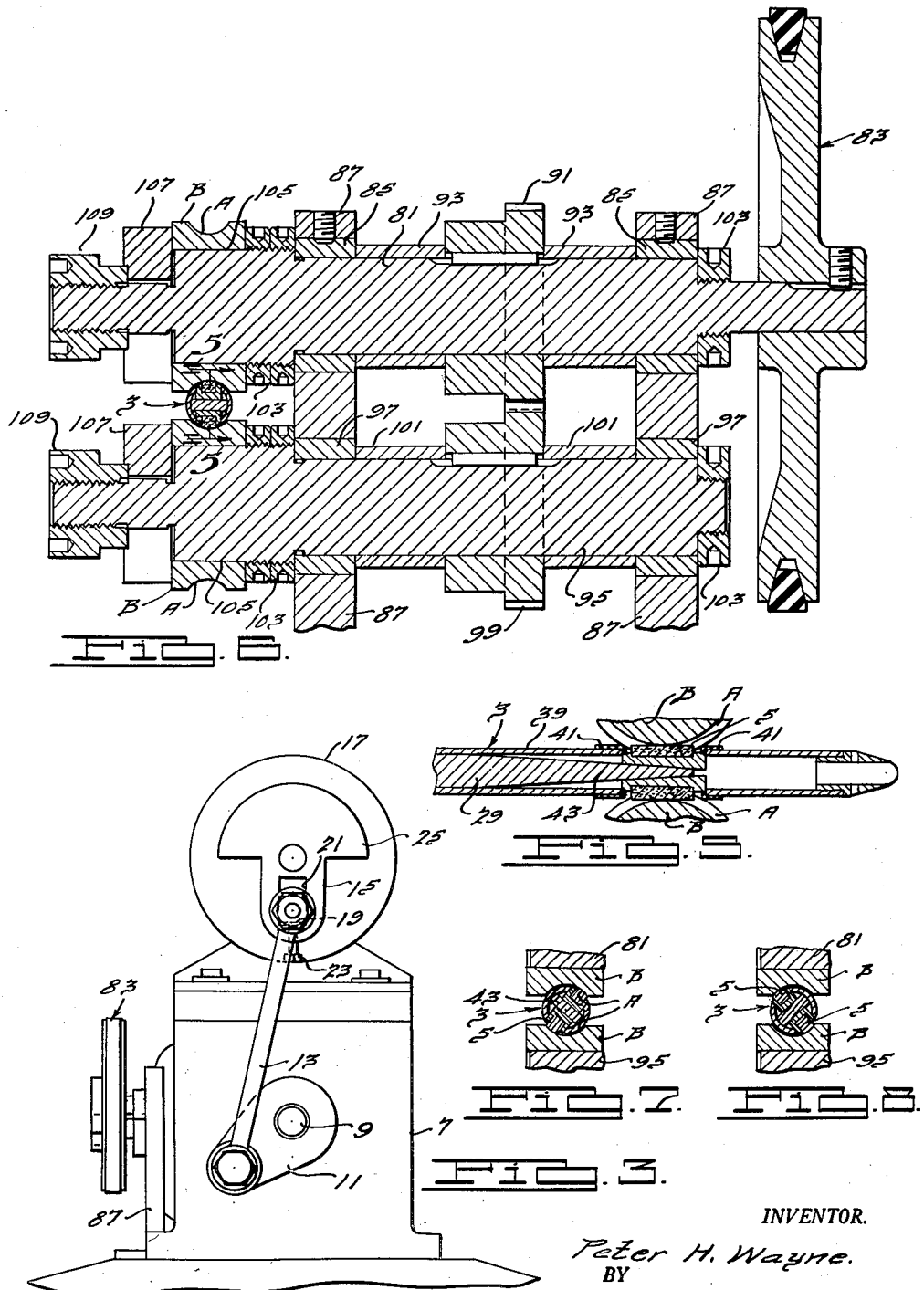
INVENTOR.
Peter H. Wayne.
BY
Harness, Dickey & Pierce
ATTORNEYS.

Patented Apr. 14, 1953

2,634,561

UNITED STATES PATENT OFFICE 2,634,561

METHOD OF HONING GROOVED ELEMENTS

Peter H. Wayne, Detroit, Mich., assignor to Micromatic Hone Corporation, Detroit, Mich., a corporation of Michigan Application October 30, 1948, Serial No. 57,538

1 Claim. (Cl. 51—291)

This invention refers to machine tools and, in particular, relates to tools for machining outer peripheral surfaces such as the external groove on the inner race of a ball bearing.

Mechanism embodying the principles of the present invention includes a rotatable tool having peripheral machining means thereon. The body to be machined, or workpiece, is mounted and rotated in a manner such that a plane through the axis of rotation of the tool passes through the peripheral surface. In order to obtain uniform wear of the machining means and to produce uniform and accurate surfaces, the tool is rotatably oscillated and either the tool or workpiece are reciprocated along the tool axis. When the machining means is of a type which wears rapidly, such as the abrasive stones used in honing, means are preferably employed for its automatic radial expansion to compensate for wear and maintain a substantially constant pressure between the workpiece and the machining means.

Thus, it is among the objects of the invention to provide a device of the type described which is capable of producing surfaces of a desired high quality finish among successive workpieces.

Another object of the invention is to provide a machine tool of the type indicated which may be easily and quickly loaded and unloaded. A further object of the invention is to provide a machine of the described type which is capable of simultaneously machining more than one workpiece with a single tool, but which does not permit irregularities in one workpiece to adversely affect the surface of another workpiece.

Other objects and features of novelty of the invention will become apparent in the description of the accompanying drawings wherein:

Fig. 2 is a side elevation with parts broken away of the machine shown in Fig. 1;

Fig. 3 is an end elevation of the machine shown in Figs. 1 and 2;

Fig. 4 is a sectional view of mechanism for actuating the tool;

Fig. 5 is a sectional view taken on line 5—5 of Fig. 6 showing means for expanding the peripheral inserts of the tool;

Fig. 6 is a section taken along the line 6—6 of Fig. 1 showing the means for holding the workpieces; and Fig. 7 and 8 are cross sections of the tool, showing it in the extreme oscillatory positions.

Figure 1:
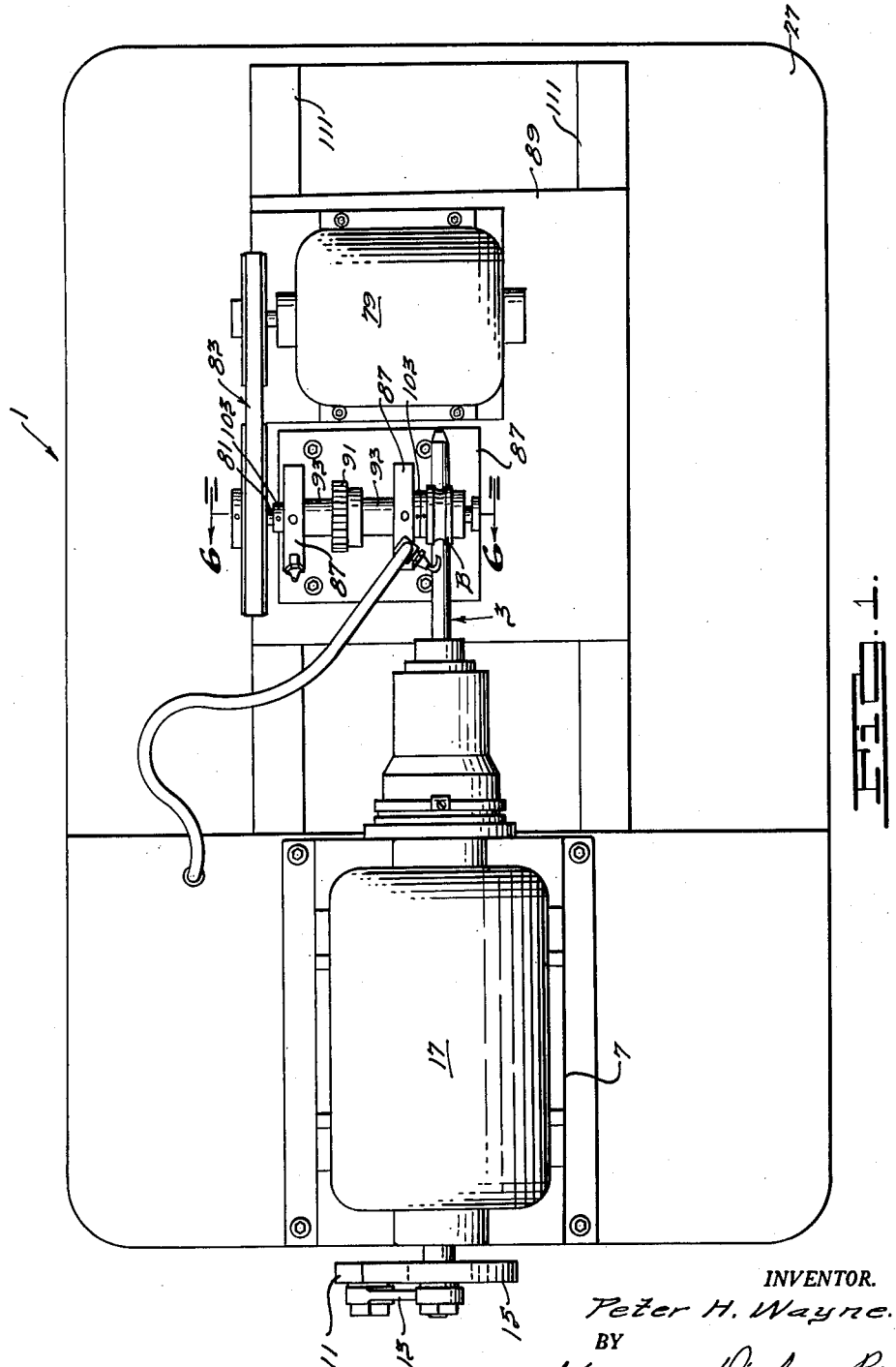
Fig. 1 is a plan view of a honing machine embodying features of the invention.

Referring to the drawings and especially to Figs. 1, 2 and 3, it will be recognized that the invention is illustrated in conjunction with a honing machine 1 having an elongated tool member 3 with peripheral abrasive inserts 5 (Fig. 5). The tool 3 projects from the tool housing or head 7 and is rotatably connected therein, by means to be presently mentioned, to a shaft 9 which projects from the opposite end of the housing 7. A crank arm 11 is secured to the shaft 9 and pivotally receives a connecting rod 13. The rod 13 is pivotally connected to an arm 15 which is secured to the driven shaft of a motor 17 that may be conveniently mounted atop the tool housing 7. Thus, rotation of the arm 15 results in rotary oscillation of the shaft 9 and the attached tool 3. It is desirable that means be provided for controlling the amplitude of this oscillation and for this purpose the rod 13 may be pivotally attached to the block 19 which slides in a slot 21 in the arm 15 but is fixedly positioned therein by means of an adjusting screw 23 which is threaded in the arm and block. In order to eliminate vibratory stresses, the arm 15 is preferably shaped to have a counterbalancing mass 25 opposite the rod 13.

The tool housing 7 is affixed by suitable means to the frame structure 27 of the machine 1 and contains mechanism which transmits rotation of the shaft 9 to the tool 3 and which acts upon an elongated cam rod 29 (Fig. 5) within the tool 3 to radially expand the stones 5. The device shown in plan and elevation in Figs. 1 and 2 for imparting these movements to the tool 3 is described in detail in Patent 2,350,527 to Douglas T. Peden, which is owned by the assignee of the present invention. As an alternative mechanism, the simplified structure of Fig. 4 may be used to impart the desired motion to the tool 3.

In Fig. 4, the shaft 9 is journaled in the end wall of a tool housing 7' and has an enlarged inner end 31 which is rotatively connected by means of a transverse pin 33 to a cylinder 35 which extends through a surrounding block 36 in the housing 7' and is journaled in the opposite end wall of the housing. Suitable means such as a coupling 37 rotatively connects the cylinder 35 to the outer tubular port on 39 of the tool 3. As shown in Fig. 5, the stones or abrasive inserts 5 are mounted in peripheral slots in the tube 39 and are urged radially inward in a conventional manner by the spring strips 41. The cam rod 29 is slidably mounted in the tube 39 and has a pointed end 43 which engages the holders of the stones 5 so that axial movement of the rod 29 wedges the stones outwardly against the resistance of the springs 41 and that of the surface being machined. Axial movement is imparted to the rod 29 by a piston 45 which reciprocates within the rotatable cylinder 35. The piston stem 47 is rotatably connected to the cylinder 35 by means of a key and slot shown at 49 and is affixed to the rod 29 by suitable means such as a threaded end engaging a threaded recess in the end of the rod 29 as shown at 51. It will thus be recognized that rotary oscillation of the shaft 9 will be transmitted by the cylinder 35 to the tool tube 39 through the coupling 37 and to the cam rod 29 through the piston stem 47 so that the component parts of the tool 3 are rotated as a unit. However, since the piston 45 and the rod 29 are slidably mounted in the cylinder 35 and tube 39, they alone reciprocate.

Forces for reciprocation are provided by pressure fluid which enters the cylinder 35 through spaced ports 53 and 55 which are disposed on either side of the faces of the piston 45. The ports 53 and 55 open into annular grooves 57 and 59 in the block 36 and these are fed by conduit passages 61 and 63 in the block 36 which are connected to the external conduits 65 and 67. Suitable controls are provided for reversing the pressure in the lines 65 and 67 and are desirable also for adjusting and controlling the amount of pressure so as to vary the force on the piston 45 and rod 29 and thus the amount of radial expansion of the stones 5. These controls may, for example, comprise a four-way valve 69 for selectively connecting the lines 65 and 67 to either the pressure line 71 or the exhaust line 73. A variable delivery pump 75 may furnish pressure fluid to the line 71 and this may have a manual adjustment 77 for regulating the output pressure of the pump, this type of unit being a standard device procurable upon the open market. It will thus be recognized that by means of the valve 69 the direction of axial movement of the rod 29 may be controlled. When pressure is admitted to ports 55, the end 43 of the rod 29 is withdrawn so that the stones 5 collapse. When pressure is admitted to ports 53, the rod 29 moves the stones 5 outwardly with a predetermined force determined by the setting of adjustment 77 on the pump 75.

As indicated hereinbefore, the tool 3 is adapted to machine an outer peripheral surface A on a workpiece B. Means are provided for rotating the workpiece B about the axis of the surface A and for reciprocating the workpiece along the axis of the tool 3, though, if desired, the tool 3 itself could be reciprocated by suitable means such as disclosed in said Patent No. 2,350,527. It is also desirable to machine more than one workpiece at a time and means are provided for quickly positioning and removing a plurality of workpieces, preferably two, with respect to the tool 3.

A preferred structure for accomplishing these purposes includes a motor 79 which drives a shaft 81 through a belt and pulley connection 83. The shaft 81 (Fig. 6) is journaled in spaced bearings 85 which are secured in an upstanding frame 87 that is mounted on the worktable 89. A gear 91 is keyed to the shaft 81 and fixed in axial position by means of the collars 93 between its opposite sides and the bearings 85. A second shaft 95 is journaled in spaced bearings 97 in the frame 87 and is preferably positioned so that a plane through the axes of the shafts 81 and 95 is normal to the axis of the tool 3. A gear 99 is keyed to the shaft 95 in driven engagement with the gear 91 and is axially positioned by the spacing collars 101. The shafts 81 and 95 are axially positioned with respect to the frame 87 by means of suitable lock nuts 103. These shafts extend beyond one side of the frame 87 and in the case of centrally apertured workpieces B are there provided with peripheral surfaces 105 which are adapted to slidably receive the workpieces B. The workpieces are clamped against lock washers 103 for rotation with the shafts by means of slotted washers 107 which slide radially over the shafts and are pressed against the workpieces by nuts 109 which are threaded on the shafts but which are of lesser diameter than the apertures in the workpieces. When the washers 107 are removed, this is possible when the nuts 109 are only slightly loosened, the workpieces B pass freely over the nuts 109 for loading and unloading purposes.

As indicated in Fig. 6, the shafts 81 and 95 are spaced so that the tool 3 just fits in the grooves A which it is desired to hone. In this particular case, since the grooves are symmetrical, the axis of the tool 3 lies in the plane of symmetry.

The stones 5 are preferably of substantially less width than the groove A or, in other words, of less included angle than the grooves with respect to the axis of the tool. By regulating the amplitude of oscillation of the stones within the limits defined by the edges of the grooves A, as shown in Figs. 7 and 8, the groove is finished accurately without rounding of the edges. Such regulation is accomplished, as hereinbefore mentioned, by means of the adjusting screw 23 which connects the rod 13 to the arm 15.

It is desirable that the gears 91 and 99 have a slightly different number of teeth so that the shafts 81 and 95 will rotate at slightly different speeds. This tends to reduce vibrations and provides a hunting effect between the two workpieces mounted thereon so that irregularities, such as a slightly uneven surface on one workpiece, are not transmitted on successive revolutions through the resulting increased pressure on the tool 3 to the identical circumferential position on the other workpiece.

The worktable 89, which carries the frame 87 and the motor 79, is slidably mounted on ways 111 for reciprocation along the axis of the tool 3, the ways 111 forming a part of the frame 27 of the machine. The worktable 89 has a depending rigid arm 115 which is affixed to a rod 117 that extends outside of the hydraulic cylinder 119 and is attached within to the reciprocable piston 121. The conduits 123 and 125 deliver pressure fluid to opposite sides of the piston 121 and flow therethrough may be selectively controlled to determine the direction of reciprocation of the table 89 by any suitable means such as the four-way valve 127. If automatic reciprocation is desired, the valve 127 may be solenoid or pilot operated, the solenoids 128 being under the control of a pilot switch or valve 129. Adjustable longitudinally spaced cam fingers 131 on the table 89, or other suitable reciprocating member, trip the switch or valve 129 at each limit of travel to alternately energize the solenoids or valve 128 in the valve 127 and thus reverse the direction of movement. The rate of reciprocation may be regulated by means of a flow control valve 133 in the pressure line 135 to the valve 127. The valve 133 may be connected to the tank through the exhaust line 137 from the valve 127 by means of the interconnecting conduit 139.

In loading the machine 1, the worktable 89 is moved away from the head 7 or 7' so that the tool 3 is not between the shafts 81 and 95, this being accomplished by suitable manipulation of the four-way valve 127 and by temporarily disconnecting the pilot switch or valve 129 from the cam fingers 131 to permit travel beyond the ordinary limits of reciprocation. The table 89 is held in this position by closing flow control valve 133. The stones 5 are also permitted to be collapsed under the influence of springs 41 as by adjusting the valve 69 of Fig. 4 to allow pressure through line 67 to force the piston 45 and attached rod 29 to withdraw as far as possible from the tool tube 39. During loading, the tool 3 may be rotatably oscillated by the shaft 9 as a result of its crank 11 and rod 13 connection to the motor 17, but the loading operation is facilitated if the motor 79 is de-energized to stop rotation of the shafts 81 and 95. With the washers 107 removed, the workpieces B are slipped on the mating shaft diameters 105 whereupon the washers 107 are replaced and the nuts 109 tightened to clamp the workpieces against the lockwashers 103. The motor 79 is then started up to rotate the shafts 81 and 95 and the connected workpieces B at slightly different speeds.

The flow control valve 133 is then opened to admit pressure to the valve 127 which should be actuated to drive the worktable toward the tool 3 until the stones 5 are inserted between the workpieces. The cam fingers 131 and switch 129 are then reconnected to control the extent of reciprocation of the workpieces B. The stones are radially expanded, as by reversing the valve 69 in Fig. 4 to admit pressure fluid to port 53 and drive the piston 53 and rod 29 into the tube 39, so that the stones reach a predetermined radius or are forced against the surfaces of grooves A with a predetermined pressure. With the stones in contact with the workpieces B, metal removal occurs and a uniform and well finished surface is obtained due to the diversified pattern of relative movement between the tool 3 and the workpieces B. This movement also results in a uniform wearing away of the surfaces of the stones 5, this wear being compensated by the continuous outward radial forces on the stones 5. After the desired surface has been obtained, the table 89 may be moved to withdraw the tool 3. The motor 79 is then stopped so that the finished workpieces B may be unloaded and replaced with others.

While the invention has been embodied in a honing machine it will be apparent that the principles thereof may be incorporated into various other machines. Closely akin to the application described are those in which laps, files, diamond impregnated inserts, and the like are used to machine the outer peripheral surfaces. Operations involving more than one stage of machining are also possible by axially spacing a plurality of machining means on the tool 3 and then reciprocating the workpieces B in spaced axial paths.

What is claimed is:

The method of honing arcuate symmetrical outer peripheral grooves on a pair of cylindrical members which includes the steps of, rotatably oscillating an expansible tool between the members while rotating the members with the tool axis and the centers of the grooves coinciding, expanding the tool into engagement with the surfaces of the grooves, and relatively reciprocating the tool and members along the axis of the tool.

PETER H. WAYNE.

References Cited in the file of this patent

UNITED STATES PATENTS

| Number | Name | Date |
|---|---|---|
| 475,939 | Haberlin | May 31, 1892 |
| 1,404,691 | Gail | Jan. 24, 1922 |
| 1,705,893 | Barnhart | Mar. 19, 1929 |
| 1,836,121 | Indge | Dec. 15, 1931 |
| 2,041,271 | Stuting | May 19, 1936 |
| 2,151,483 | Nichols | Mar. 21, 1939 |
| 2,234,382 | Neman | Mar. 11, 1941 |
| 2,252,096 | Pew | Aug. 12, 1941 |
| 2,280,379 | Cramer | Apr. 21, 1942 |
| 2,335,745 | Drake | Nov. 30, 1943 |
| 2,398,022 | Marren | Apr. 9, 1946 |

FOREIGN PATENTS

| Number | Country | Date |
|---|---|---|
| 544,765 | Germany | Feb. 26, 1932 |

OTHER REFERENCES

"Tool Engineering," "Jigs and Fixtures," by Dowd and Curtis, page 44, published 1933.